H. F. MÜLLER.
SAUSAGE STUFFING MACHINE.
APPLICATION FILED AUG. 10, 1911.

1,014,605.

Patented Jan. 9, 1912.

INVENTOR
Henry F. Müller
BY Chas. A. Cutter
ATTORNEY

UNITED STATES PATENT OFFICE.

HENRY F. MÜLLER, OF PHILADELPHIA, PENNSYLVANIA, ASSIGNOR TO RICHARD T. RANDALL & CO., OF PHILADELPHIA, PENNSYLVANIA, A FIRM.

SAUSAGE-STUFFING MACHINE.

1,014,605.  Specification of Letters Patent.  Patented Jan. 9, 1912.

Application filed August 10, 1911. Serial No. 643,303.

*To all whom it may concern:*

Be it known that I, HENRY F. MÜLLER, a citizen of the United States and a resident of the city and county of Philadelphia, State of Pennsylvania, have invented certain new and useful Improvements in Sausage-Stuffing Machines, of which the following is a specification.

My invention relates to improvements in sausage stuffing machines and more particularly to improvements in the construction of the top of the cylinder, from which the meat is forced into the casings, whereby said top, even in machines of the heaviest construction, may be easily handled by a single operator without the aid of any extraneous devices.

Figure 3:
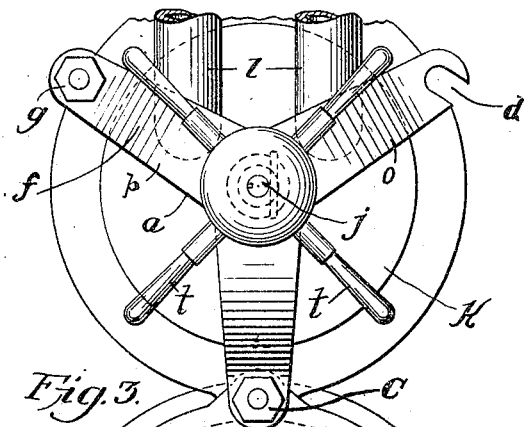
Figure 2:
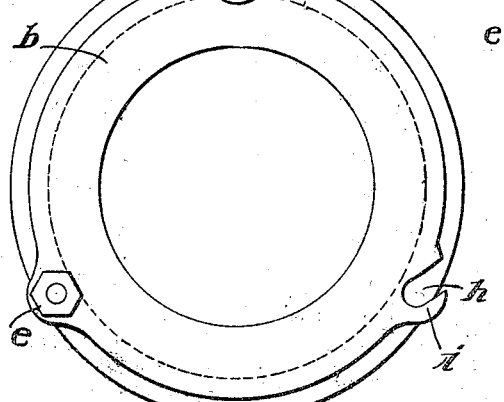
Figure 2:
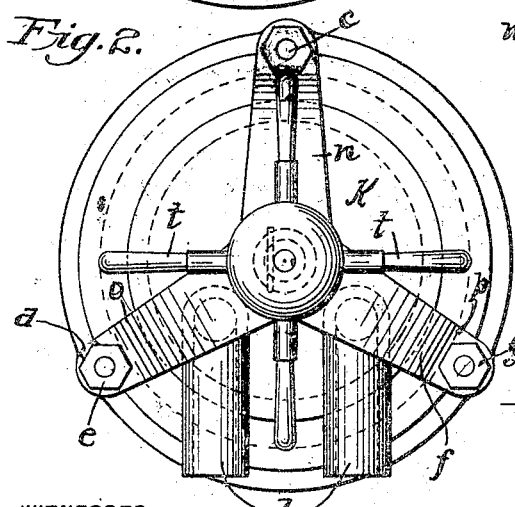
Figure 1:
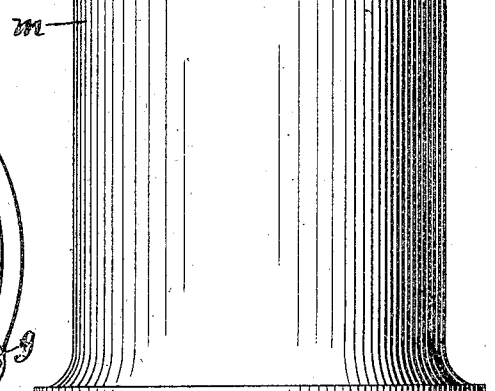

In the accompanying drawings forming part of this specification and in which similar letters of reference indicate similar parts throughout the several views: Figure 1, is a side elevation of a sausage stuffing machine embodying my improvements; Fig. 2, a plan of Fig. 1; Fig. 3, a plan of the machine showing the top swung open.

$m$ is the cylinder of a sausage stuffing machine, $k$ the lid or head for closing the top, $l$ the tubes carried by the head through which the meat forced from the cylinder in the usual manner passes to the casings.

$f$ is a yoke, preferably having three legs $n$—$o$—$p$, the central part of which is threaded for a screw $s$ the lower end of which carries the lid or head $k$ and the upper end of which is furnished with some means for conveniently turning it, the levers $t$ for instance. One of the legs, as $n$, of the yoke is pivotally attached to the cylinder $m$ at $c$, another leg, as $o$, is furnished with a slotted end $d$ adapted to engage a bolt $e$ carried by cylinder $m$, and another leg, as $p$, carries a headed bolt $g$ which is adapted to engage a slot $h$ formed in a lug $i$ forming part of cylinder $m$. The yoke $f$ and the head $k$ can be swung horizontally around the pivot $c$ to open the top of the cylinder for charging or cleaning. When the yoke is swung back so that the head is directly over the top of the cylinder the slotted end $d$ of the leg $o$ passes around the bolt $e$ and under the head of this bolt and the bolt $g$ carried by leg $p$ passes into slot $h$ formed in lug $i$, the head on the lower end of this bolt engaging the end of the lug at the lower end of the slot. The head $k$ is set firmly down against the top of the cylinder by means of the screw $s$ and when this is done the apparatus, so far as the tight and secure closing of the cylinder head is concerned, is ready for operation.

In large machines of this class the top with its connected parts is very heavy, too heavy in fact to be lifted by one man without the aid of levers or tackles of some kind. In my construction the top may be loosened and swung so as to open the cylinder by one man without any assistance whatever.

Having thus described my invention I claim as new and desire to secure by Letters Patent:

1. In a closure, in combination, a cylinder furnished with a fixed stop upon its top and a notch upon its side, said stop, a yoke having three legs one of which is pivotally secured to said cylinder so that it can be swung in a horizontal plane and the other two legs of which are furnished with means adapted to engage said stop and notch, said engaging means, a lid adapted to close the top of the cylinder, and means carried by said yoke for adjustably carrying said lid.

2. In a closure, in combination, a vertical cylinder, a yoke having three legs one of which is pivotally secured to said cylinder, one of which is furnished with a slot $d$ and the other of which carries a bolt $g$, a stop carried by said cylinder adapted to be engaged by the slotted leg of the yoke, a slotted lug carried by said cylinder adapted to receive the bolt carried by the third leg of the yoke, a screw carried by said yoke, and a head or lid carried by said screw.

HENRY F. MÜLLER.

Witnesses:
 ANDREW SCHIMMEL, Jr.,
 GEORGE H. WAGNER.